L. A. BIGGAR.
PULLEY.
APPLICATION FILED MAR. 1, 1910.

1,025,108.

Patented Apr. 30, 1912.

Witnesses
E. J. Stout.
R. W. Bailey.

Inventor
Leroy A. Biggar.
By Heaward P. Denison
Attorney.

UNITED STATES PATENT OFFICE.

LEROY A. BIGGAR, OF ONEIDA, NEW YORK, ASSIGNOR TO ONEIDA STEEL PULLEY COMPANY, OF ONEIDA, NEW YORK, A CORPORATION OF NEW YORK.

PULLEY.

1,025,108.      Specification of Letters Patent.      Patented Apr. 30, 1912.

Application filed March 1, 1910. Serial No. 546,713.

*To all whom it may concern:*

Be it known that I, LEROY A. BIGGAR, of Oneida, in the county of Madison, in the State of New York, have invented new and useful Improvements in Pulleys, of which the following, taken in connection with the accompanying drawings, is a full, clear, and exact description.

This invention relates to improvements in pulleys, in which it is desired to increase the friction upon the belt face for the purpose of increasing the efficiency, thereby preventing the slipping of the belt and enabling it to transmit greater power.

In the use of pulleys for belts or even when used as brakes, the belt or contacting surface is constantly slipping more or less over the smooth surface thereof, thereby causing a great loss of efficiency, and my object, therefore, is to construct a pulley and particularly the band or rim thereof so as to receive and retain permanent inserts which shall increase the friction between the belt and the pulley face.

I make no claim to the inserts *per se*, as I am aware that it has heretofore been proposed to use inserts of cork, wood, composition, india rubber, fibrous material and soft metals of various kinds; but my invention particularly refers and relates to the means for holding such inserts in position so as to produce superior results and, to that end, my invention consists in the several new and novel features of construction hereinafter described and which I specifically set forth in the claims which are hereunto annexed.

It is constructed as follows, reference being had to the accompanying drawings in which:—

Figure 1:
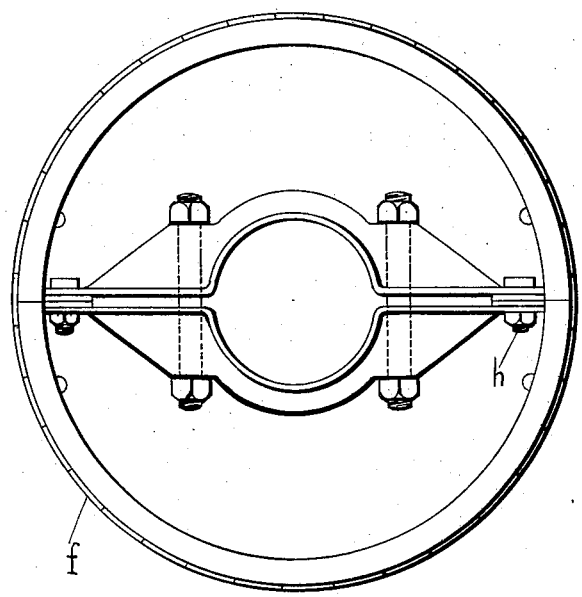
Figure 2:
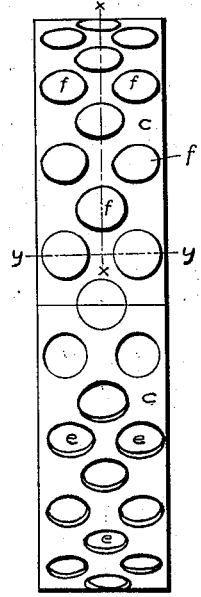
Figure 3:
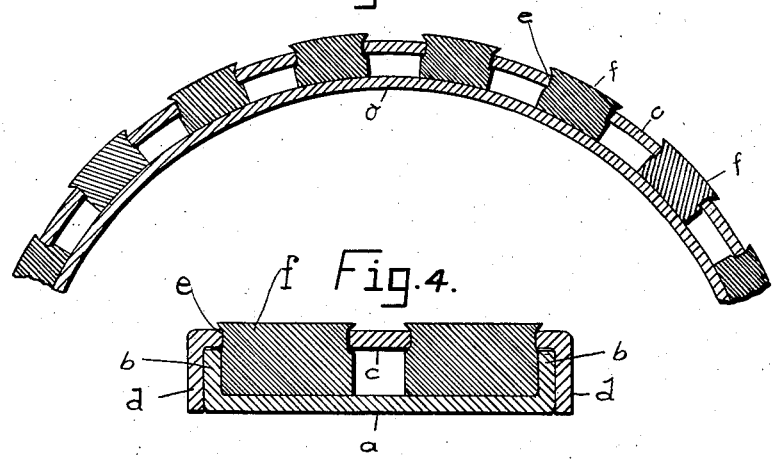
Figure 4:
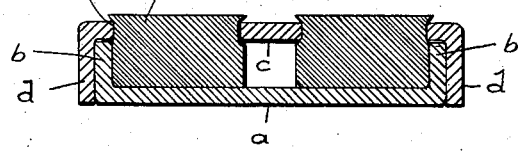

Figure 1 shows a side view of a sheet metal split pulley showing the inserts in one face thereof. Fig. 2 is a face view of the pulley, the upper portion showing the inserts and the lower portion showing the openings to receive the inserts. Fig. 3 is a longitudinal section on line —x x—, Fig. 2. Fig. 4 is a cross section on line —y y— of Fig. 2.

Similar letters of reference indicate the corresponding parts.

The pulley shown in the drawings is the usual split sheet metal pulley having a rim made of two component parts or bands, —a— being the inner band, having preferably upturned edges or flanges —b—, and —c— is the outer band, having inwardly turned flanges —d— and insert openings —e—.

—f— are the inserts made of cork, fibrous material, india rubber, composition, or in fact any material which will insure friction between the face of the pulley and the belt to prevent the latter from slipping thereon and at the same time to obviate injury to the belt. The object of the band —a— is to form a substantially rigid backing or seat for the inserts —f— to hold such inserts against inward displacement from their openings —e— and in fixed relation to the periphery of the rim, thereby maintaining a practically uniform contact surface for the belt. The inserts are normally of greater diameter than the openings —e— and are compressed and forced into the openings —e— and rest at their inner ends upon the band —a— and are allowed to expand sufficiently to retain their position in the band —c— by such expansion. The bands —a— and —c— of the rim are held spaced apart by the flanges —b— which serve as a support for the band —c—, the flanges —d— serving to hold both bands against relative lateral movement. I may also dispose of the flanges —b— from the band —a— and provide other means for spacing the bands apart and likewise the flange —d— from the band —c— may be entirely omitted.

I do not limit myself to the structure of rim as shown in cross section in Fig. 4 as it will be evident that the band —a— may be made wider and the band —c— narrower so as to reverse the position of the flanges.

A pulley constructed in accordance with my invention is practically indestructible and reduces the possibility of belt slipping to a minimum.

What I claim is:

1. A metal pulley having a rim comprising two bands, one within the other, the outer band having apertures and inserts mounted therein and having their inner ends resting on the inner band, the outer band being supported directly by the inner band and at a fixed distance thereform.

2. A metal pulley having a rim comprising two bands, one within the other, the inner band having an outturned flange butting against the outer band, said outer band having apertures and inserts mounted therein and resting on the inner band.

3. A metal pulley having a rim comprising two bands concentrically mounted one within the other and having oppositely extending flanges, the flange on the inner band bearing against the outer band, said outer band having apertures and inserts mounted in said apertures, the inner ends resting on the inner band.

In witness whereof I have hereunto set my hand this 22d day of February, 1910.

LEROY A. BIGGAR.

Witnesses:
N. G. STARK,
FLORENCE M. HYDE.

Copies of this patent may be obtained for five cents each, by addressing the "Commissioner of Patents, Washington, D. C."